United States Patent
Esmaeilzadeh, V et al.

(10) Patent No.: US 11,521,112 B2
(45) Date of Patent: Dec. 6, 2022

(54) METHODS AND SYSTEMS FOR INTEGRATING MACHINE LEARNING/ANALYTICS ACCELERATORS AND RELATIONAL DATABASE SYSTEMS

(71) Applicant: Georgia Tech Research Corporation, Atlanta, GA (US)

(72) Inventors: Hadi Esmaeilzadeh, V, Atlanta, GA (US); Divya Mahajan, Atlanta, GA (US); Joon Kyung Kim, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 915 days.

(21) Appl. No.: 16/355,512

(22) Filed: Mar. 15, 2019

(65) Prior Publication Data
US 2019/0287017 A1 Sep. 19, 2019

Related U.S. Application Data

(60) Provisional application No. 62/643,329, filed on Mar. 15, 2018.

(51) Int. Cl.
| | |
|---|---|
| *G06N 20/00* | (2019.01) |
| *G06F 16/901* | (2019.01) |
| *G06N 5/02* | (2006.01) |
| *G06F 9/50* | (2006.01) |
| *G06F 16/242* | (2019.01) |

(52) U.S. Cl.
CPC .......... *G06N 20/00* (2019.01); *G06F 9/5011* (2013.01); *G06F 9/5038* (2013.01); *G06F 16/2448* (2019.01); *G06F 16/9024* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 9,141,670 B2* | 9/2015 | Branscome | G06F 16/24569 |
| 2011/0202550 A1* | 8/2011 | Chen | G06F 16/2455 707/769 |
| 2016/0012107 A1* | 1/2016 | Asaad | G06F 16/24569 707/764 |
| 2016/0098439 A1* | 4/2016 | Dickie | G06F 16/215 707/693 |
| 2016/0125118 A1* | 5/2016 | Chaudhuri | G06F 30/34 716/101 |

* cited by examiner

*Primary Examiner* — Eric C Wai
(74) *Attorney, Agent, or Firm* — Troutman Pepper Hamilton Sanders LLP; Ryan A. Schneider

(57) ABSTRACT

A method for database management is disclosed. The method may include receiving an algorithm from a user. Based on the algorithm, a hierarchical dataflow graph (hDFG) may be generated. The method may further include generating an architecture for a chip based on the hDFG. The architecture for a chip may retrieve a data table from a database. The data table may be associated with the architecture for a chip. Finally, the algorithm may be executed against the data table, such that an action included in the algorithm is performed.

20 Claims, 5 Drawing Sheets

METHODS AND SYSTEMS FOR INTEGRATING MACHINE LEARNING/ANALYTICS ACCELERATORS AND RELATIONAL DATABASE SYSTEMS

CROSS-REFERENCE TO RELATED APPLICATION

This application claims the benefit of, and priority under 35 U.S.C. § 119(e) to, U.S. Provisional Patent Application No. 62/643,329, entitled "Hardware Integrator for Relational Database Management Systems and Machine Learning Accelerators," filed Mar. 15, 2018, the contents of which are hereby incorporated by reference herein in their entirety as if fully set forth below.

STATEMENT REGARDING FEDERALLY SPONSORED RESEARCH

This invention was made with government support under grant numbers CNS#1703812, ECCS#1609823, CCF#1553192, and AFOSR award #FA9550-17-1-027, awarded by the by the National Science Foundation. The government has certain rights in the invention.

FIELD OF THE INVENTION

The presently disclosed subject matter relates generally to methods and systems for database management and, more particularly, to methods and systems for generating a chip architecture to perform an algorithm against certain data.

BACKGROUND

The data revolution is being fueled by advances in several areas, including databases, high-performance computer architecture, and machine learning. Databases, more than ever before, are capable of storing tremendous amounts of data. Machine learning algorithms, among other things, are able to quickly identify correlations that would take humans days, if not weeks. Further, the computer architecture, where these databases are housed and on which the machine learning algorithms are performed, has grown increasingly powerful and efficient.

Despite these advances, implementing machine learning algorithms against larger databases has proven timely and manually intensive. Accordingly, there is a need for an improved method and system for generating an architecture capable of efficiently executing a machine learning algorithm against large databases.

SUMMARY

Aspects of the disclosed technology include methods and systems for database management. Consistent with the disclosed embodiments, the methods can include one or more processors, computing devices, or databases. In some cases, the methods and systems may include receiving user defined functions from a user. The user defined functions may be associated with an algorithm designed to perform an action against a database (e.g., an update function). The method may further include determining, based on, at least in part, the user defined functions, operations needed to perform the action against the database. Next, the method may generate a hierarchical dataflow graph (hDFG). Subsequently, the method may determine a chronological order of the operations based on the hDFG. Afterwards, the method may generate a first set of instructions and a second set of instructions based on the chronologically ordered operations. The first set of instructions and the second set of instructions may be compiled into executable code. The method may further include generating an architecture for a chip based on the hDFG and/or the chronologically ordered operations. The architecture for a chip may retrieve a data table from the database and further associate the data table with the architecture for a chip. Finally, the method may include executing the algorithm against the architecture for a chip such that the action is performed against the data table.

In some embodiments, generating the hDFG may be based on the algorithm.

In some embodiments, the algorithm may be a machine learning algorithm.

In some embodiments, each of the nodes may further comprise a respective mathematical operation.

In some embodiments, each of the edges comprise a respective multi-dimensional vector.

According to some embodiments, the method may further include generating an access engine based on the first set of instructions and associating the access engine with the architecture for a chip.

In some embodiments, the access engine may retrieve the data table from the database.

According to some embodiments, the method may further include generating an execution engine based on the second set of instructions and associating the execution engine with the architecture for a chip.

In some embodiments, the execution engine may execute the algorithm against the architecture for a static chip.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE DRAWINGS

Reference will now be made to the accompanying drawings, which are not necessarily drawn to scale, are incorporated into and constitute a portion of this disclosure, illustrate various implementations and aspects of the disclosed technology, and, together with the description, serve to explain the principles of the disclosed technology. In the drawings.

DETAILED DESCRIPTION

Figure 1:
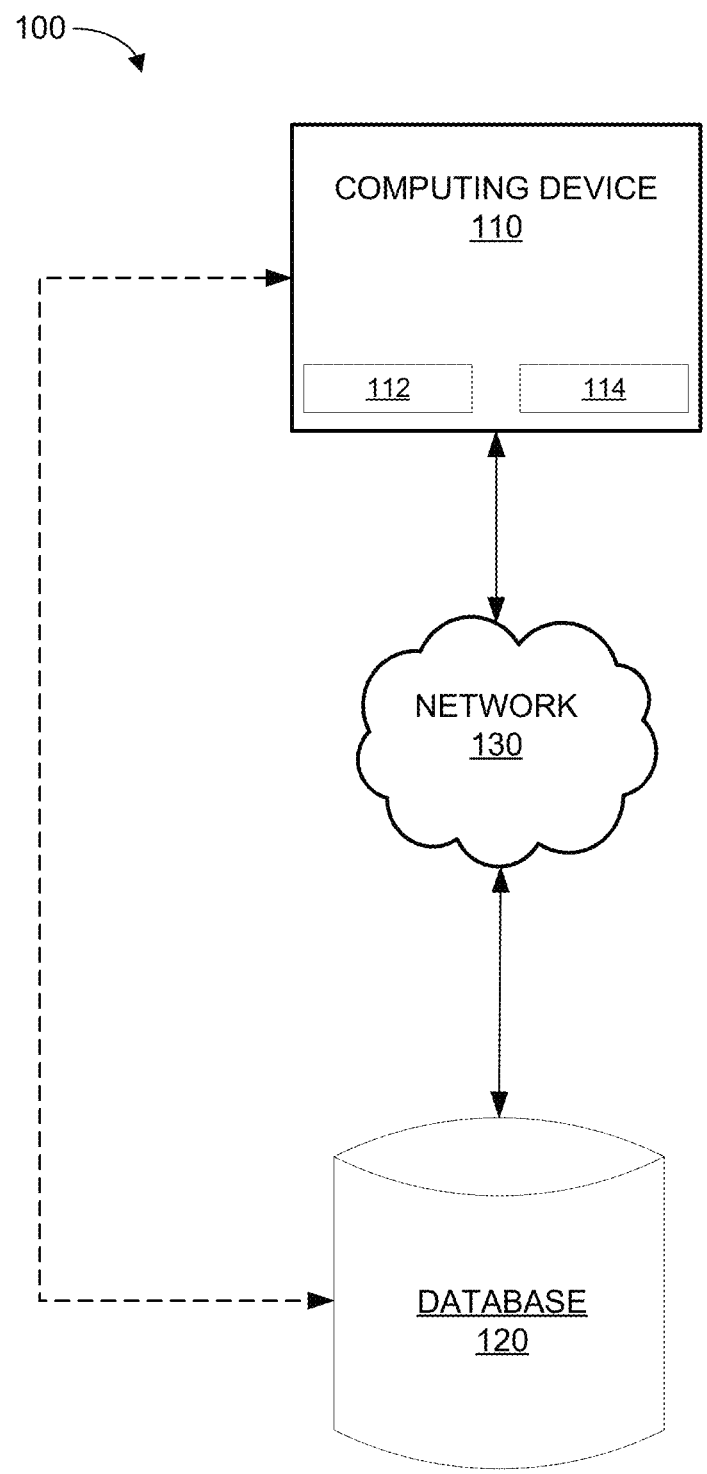
FIG. 1 is a diagram of an example system for database management, in accordance with some examples of the present disclosure.

Some implementations of the disclosed technology will be described more fully with reference to the accompanying drawings. This disclosed technology can be embodied in many different forms, however, and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

It is also to be understood that the mention of one or more method steps does not imply that the methods steps must be performed in a particular order or preclude the presence of additional method steps or intervening method steps between the steps expressly identified.

Examples of the present disclosure may involve automatically mapping a high-level specification of advanced analytics queries to an architecture for a chip. The architecture for a chip may be generated for one or more user defined functions (UDF), expressed as a part of a query (e.g., an SQL query) using a domain-specific language (e.g., Python). To realize an efficient in-database integration, embodiments of the present disclosure may contain an atypical hardware structure (e.g., an access engine), directly interfacing with the buffer pool of the database. The access engine may extract, cleanse, and process the training data tuples that are consumed by a multi-threaded the execution engine that executes the analytics algorithm. Embodiments of the present disclosure may be integrated with PostgreSQL to generate hardware accelerators for a range of real-world and synthetic datasets running diverse machine learning algorithms.

In an example scenario, a real estate agent, Mary, wants to run a program identifying residents of Georgia likely to purchase homes in the next six months. To identify the residents, Mary has a programmer, Dave, write a program evaluating several criteria (e.g., income, renter status, years renting, credit score, and/or age). Mary uploads the program to a computer. The computer runs a second program that determines the steps necessary to execute Mary's program against a database containing all the residents of Georgia. Running Mary's program against the entire database or downloading the contents of the database and then running Mary's program against the copy of the database would be time consuming because the computer's processor must perform other tasks in addition to querying the database. Here, the operations associated with Mary's program are ultimately used to generate a dedicated architecture for a chip that accesses pages of a database, retrieves portions of the database, and executes the algorithm against the database. Therefore, while the computer's processor performs several tasks, the architecture for a chip is able to independently query the database and output the results to Mary quickly.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows an example environment 100 where certain aspects of the present disclosure may be implemented. The components and arrangements shown in FIG. 1 are not intended to limit the disclosed embodiments as the components used to implement the disclosed processes and features can vary. As shown in FIG. 1, in some implementations the environment 100 may include a computing device 110 and a database 120. The computing device 110 may include a processor 112 and an application 114. The database 120 may be part of another device having one or more processors. As non-limiting examples, the computing device 110 may be a personal computer, a laptop computer, a tablet, a desktop computer, a mainframe, and/or the like. The network 130 can include a network of interconnected computing devices such as, for example, an intranet, a cellular network, or the Internet. And, while shown as a single device in FIG. 1, the web server 130 can include one or more physical or logical devices (e.g., servers), cloud servers, remote servers, etc. An example computer architecture that may be used to implement the computing device 110 may be described below with reference to FIG. 5.

The computing device 110 may receive one or more user defined functions (UDFs) from a user. The user may input the UDFs via the application 114. The processor 112 may determine the operations needed to perform the action against the database. Further, the processor 112 may generate a hierarchical dataflow graph (hDFG). The hDFG may include nodes and edges. The processor 112 may also generate a first set of instructions and/or a second set of instructions based on the chronologically ordered operations. The first set of instructions and/or the second set of instructions may be compiled by the computing device 110. In some embodiments, the processor 112 may perform this function. The processor 112 may also generate an architecture for a chip 200 based on the hDFG and/or the chronologically ordered operations.

The architecture for a chip 200 may be located within an area of memory of the computing device 110. The architecture for a chip 200 may retrieve a data table from the database 120. The computing device 110 may be in communication with the database 120 via the network. In other embodiments, the computing device 110 may physically connect to the database 120. The architecture for a chip 200 may associate the data table with itself, i.e., store the information associated with the data table on the architecture for a chip 200. Furthermore, the architecture for a chip 200 may execute the algorithm such that an action associated with the algorithm is performed on the data table.

Figure 2:
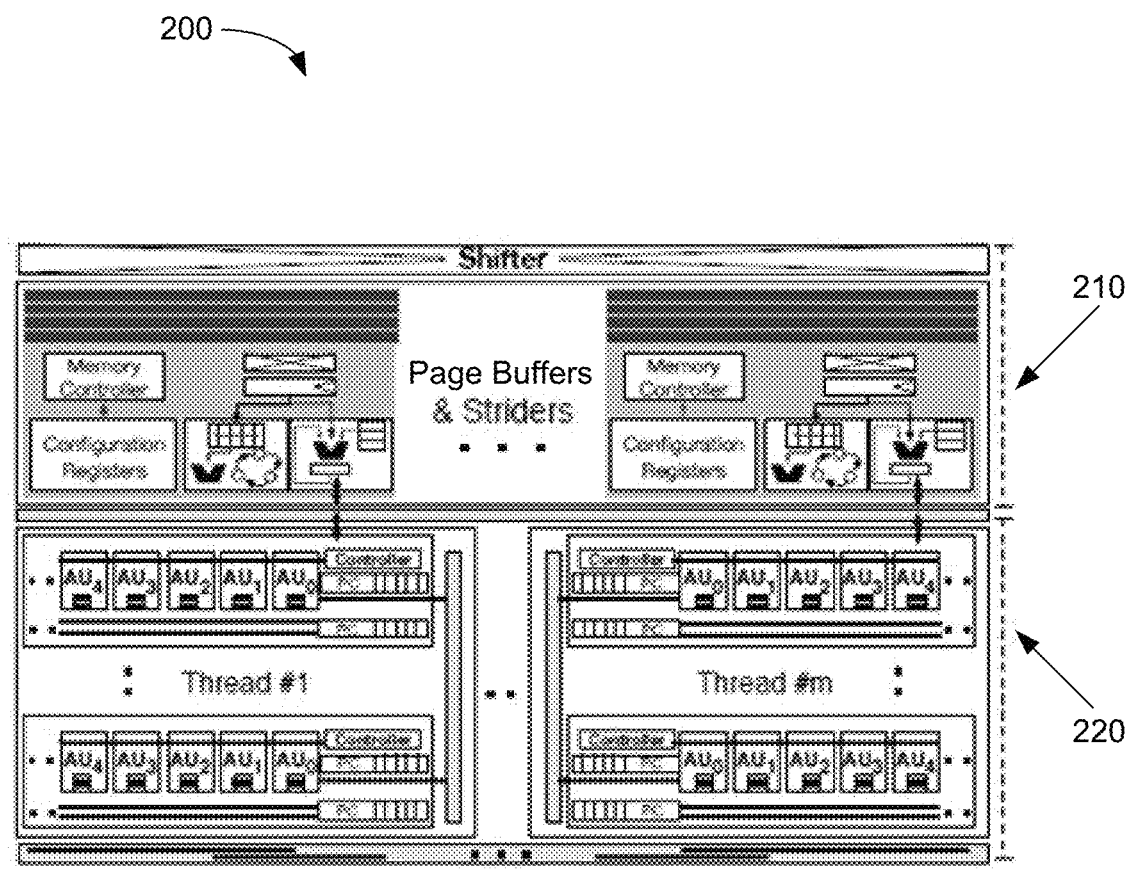
FIG. 2 is an illustration of an architecture for a chip, in accordance with some examples of the present disclosure.

FIG. 2 shows an illustration of an architecture for a chip. The architecture for a chip may include an access engine 210 and an execution engine 220. The access engine 210 and/or the execution engine 220 may be multi-threaded. Further, the access engine 210 and/or the execution engine 220 may have a respective custom Instruction Set Architecture (ISA) to program their hardware designs. The access engine 210 may include a first program (e.g., Striders), ensuring compatibility between data stored in the database 120 and the execution engine 220 by performing the computations required by the algorithm. The access engine 210 and the execution engine 220 may be configured according to the page layout and the user defined function (UDF) specification, respectively.

The access engine 210 may be responsible for storing pages of data and converting them from a database page format to raw numbers that may be processed by the execution engine 220. The access engine 210 may use the Advanced Extensible Interface (AXI) interface to transfer the data to and from the execution engine 220, the shifters properly align the data, and the first program unpacks the database pages. AXI interface may be a type of Advanced Microcontroller Bus Architecture open-standard, on-chip interconnect specification for system-on-a-chip (SoC) designs. It may be vendor agnostic and standardized across different hardware platforms. The access engine 210 may use this interface to transfer uncompressed database pages to page buffers and configuration data to configuration registers. Configuration data may include the first program and execution engine instructions and necessary meta-data. Both the training data in the database pages and the configuration data may be passed through a shifter for alignment, according to the read width of the block RAM on a target Field Programmable Array (FPGA). A separate channel for configuration data may incorporate a finite state machine to dictate the route and destination of the configuration information.

To amortize the cost of data transfer and avoid the suboptimal usage of the FPGA bandwidth, the access engine 210 and the first program may process database data at a page level granularity. Training data may be written to multiple page buffers, where each buffer stores one database page at a time and has access to its personal Strider (discussed below). Alternatively, each tuple could have been extracted from the page by the central processing unit (CPU) and sent to the FPGA for consumption by the execution engine 220. This approach would likely fail to exploit the bandwidth available on the FPGA, as only one tuple would be sent at a time. Furthermore, using the CPU for data extraction would have a significant overhead due to the handshaking between CPU and FPGA. Offloading tuple extraction to the accelerator using the first program may provide a unique opportunity to dynamically interleave unpacking of data in the access engine 210 and processing it in the execution engine 220.

It may be common for data to be spread across pages, where each page employs pointer chasing. Two tuples may not be simultaneously processed from a single page buffer, as the location of one could depend on the previous. Therefore, examples of the present disclosure may store multiple pages on the FPGA and may parallelize data extraction from the pages across their corresponding first program. For every page, the first program may first process the page header and extract necessary information about the page and store it in the configuration registers. The information may include offsets, such as the beginning and size of each tuple, which may be either located or computed from the data in the header. This auxiliary page information is used to trace the tuple addresses and read the corresponding data from the page buffer. After each page buffer, the shifter may ensure alignment of the tuple data for the first program. From the tuple data, its header is processed to extract and route the training data to the execution engine. The number of first programs and database pages stored on-chip can be adjusted according to the Broadcast Recognition Access Method (BRAM) storage available on the target FPGA. The internal workings of the first program are dictated by its instructions that depend on the page layout and page size of the target Relational Data Base Management System (RDBMS).

Figure 3:
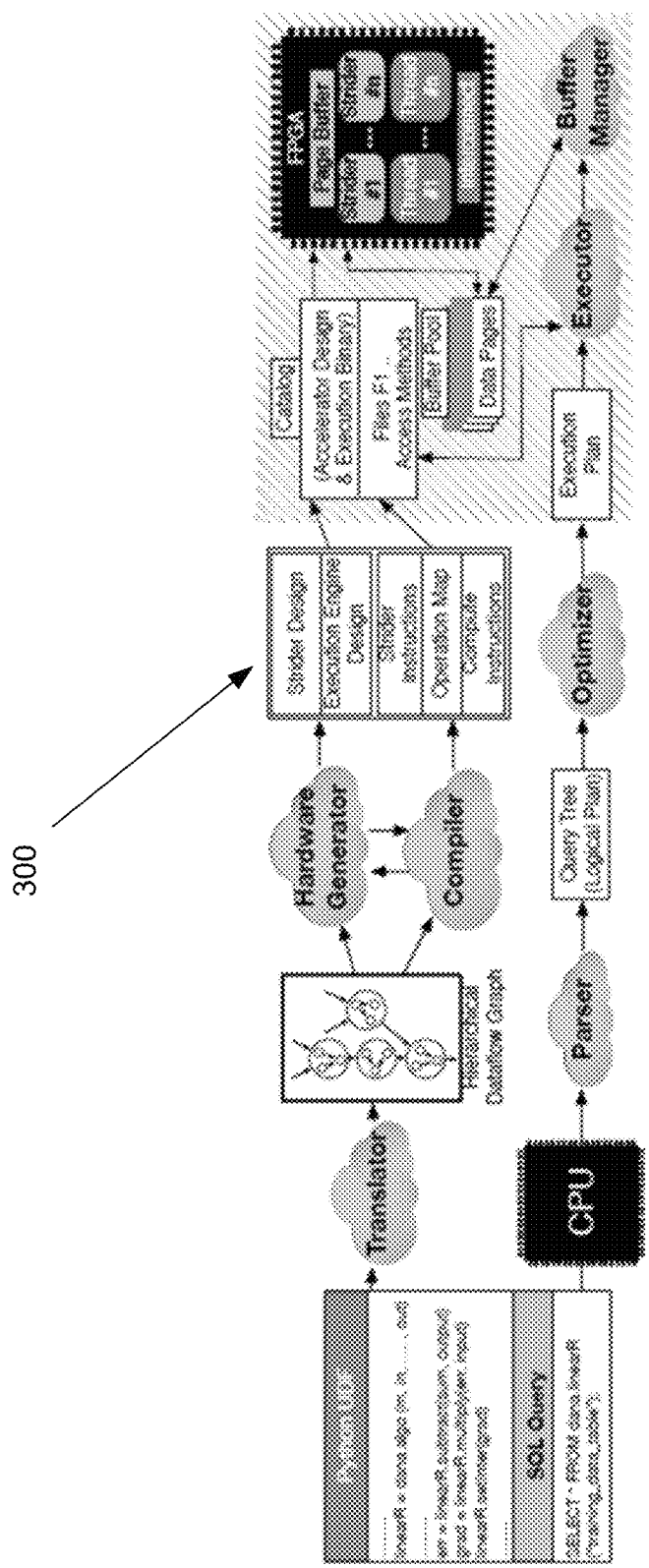
FIG. 3 is an example workflow diagram for database management, in accordance with some examples of the present disclosure.

FIG. 3 illustrates an example workflow diagram for database management. The bottom section of the diagram illustrates integration within the traditional software stack of data management systems and the top portion represents certain embodiments of the present disclosure. As shown, a user may specify her desired algorithm as a UDF using a simple domain-specific language (DSL) integrated within Python. The system 300 may perform static analysis and compilation of the Python functions to program the FPGA with a high-performance, energy-efficient hardware accelerator design. The hardware design may be tailored to both the algorithm and page specifications of the RDBMS engine. To run the hardware accelerated UDF on her training data, the user may provide a SQL query. The system 300 may store accelerator metadata (Strider and execution engine instruction schedules) in the RDBMS's catalog along with the name of a UDF to be invoked from the query. As shown in FIG. 3, the RDBMS catalog may be shared by the database engine and the FPGA. The RDBMS may parse, optimize, and execute the query while treating the UDF as a black box. During query execution, the RDBMS may fill the buffer pool, from which the system 300 may ship the data pages to the FPGA for processing. The system 300 and the RDBMS engine may work in tandem to generate the appropriate data stream, data route, and accelerator design for the algorithm, database page layout, FPGAg triad. Each component of the system 300 is briefly described below.

The following describes the programming interface as shown in FIG. 3. The front end may expose a Python-embedded DSL to express the ML algorithm as a UDF. The UDF may include an update rule that specifies how each tuple or record in the training data updates the ML model. The UDF may also include a merge function that specifies how to process multiple tuples in parallel and aggregate the resulting ML models. The DSL may constitute a diverse set of operations and data types that cater to a wide range of advanced analytics algorithms. Any combination of these operations may be automatically converted to a final synthesizable FPGA accelerator (e.g., architecture for a chip 200).

Turning to the translator, the translator may convert the UDF into a hierarchical DataFlow Graph (hDFG) by the parser. Each node in the hDFG may represent a mathematical operation allowed by the DSL, and each edge may be a multidimensional vector on which the operations may be performed. The information in the hDFG may enable the backend to optimally customize the reconfigurable architecture and schedule and map each operation for a high-performance execution.

The hardware may interface with the database engine through a specialized structure called Striders, that may extract high-performance, and provide low energy computation. Striders may eliminate the CPU from the data transformation process by directly interfacing with a buffer pool of the database 120 to extract the training data pages. Further, the first program (e.g., Striders) may process data at a page granularity to amortize the cost of per-tuple data transfer from memory to the FPGA. To exploit this vast amount of data available on-chip, the architecture may be equipped with execution engines (e.g., execution engine 220) running multiple parallel instances of the update rule. This architecture may be customized by a compiler and a hardware generator in accordance to the FPGA specifications, database page layout, and/or the analytics function.

Both the access engine 210 and the execution engine 220 may be programmed using their respective Instruction Set Architectures (ISAs). The Strider instructions may process page headers, tuple headers, and extract the raw training data from a database page. Different page sizes and page layouts may be targeted using this ISA. The ISA associated with the execution engine 220 may describe the operation flow required to run the analytics algorithm in selective Single-Instruction Multi-Data (SIMD) mode.

The compiler and hardware generator may ensure compatibility between the hDFG and the hardware accelerator. For the given hDFG and FPGA specifications (such as number of DSP Slices and BRAMs), the hardware generator may determine the parameters for the execution engine and Striders to generate the final FPGA synthesizable accelerator. The compiler may convert the database page configuration into a set of instructions that process the page and tuple headers and transform user data into a floating point format. Additionally, the compiler may generate a static schedule for the accelerator, a map of where each operation is performed, and/or execution engine instructions.

As described above, providing flexibility and reconfigurability of hardware accelerators for advanced analytics is a challenging but pertinent problem. Examples of the present disclosure present a multifaceted solution that untangles these challenges one by one.

Figure 4:
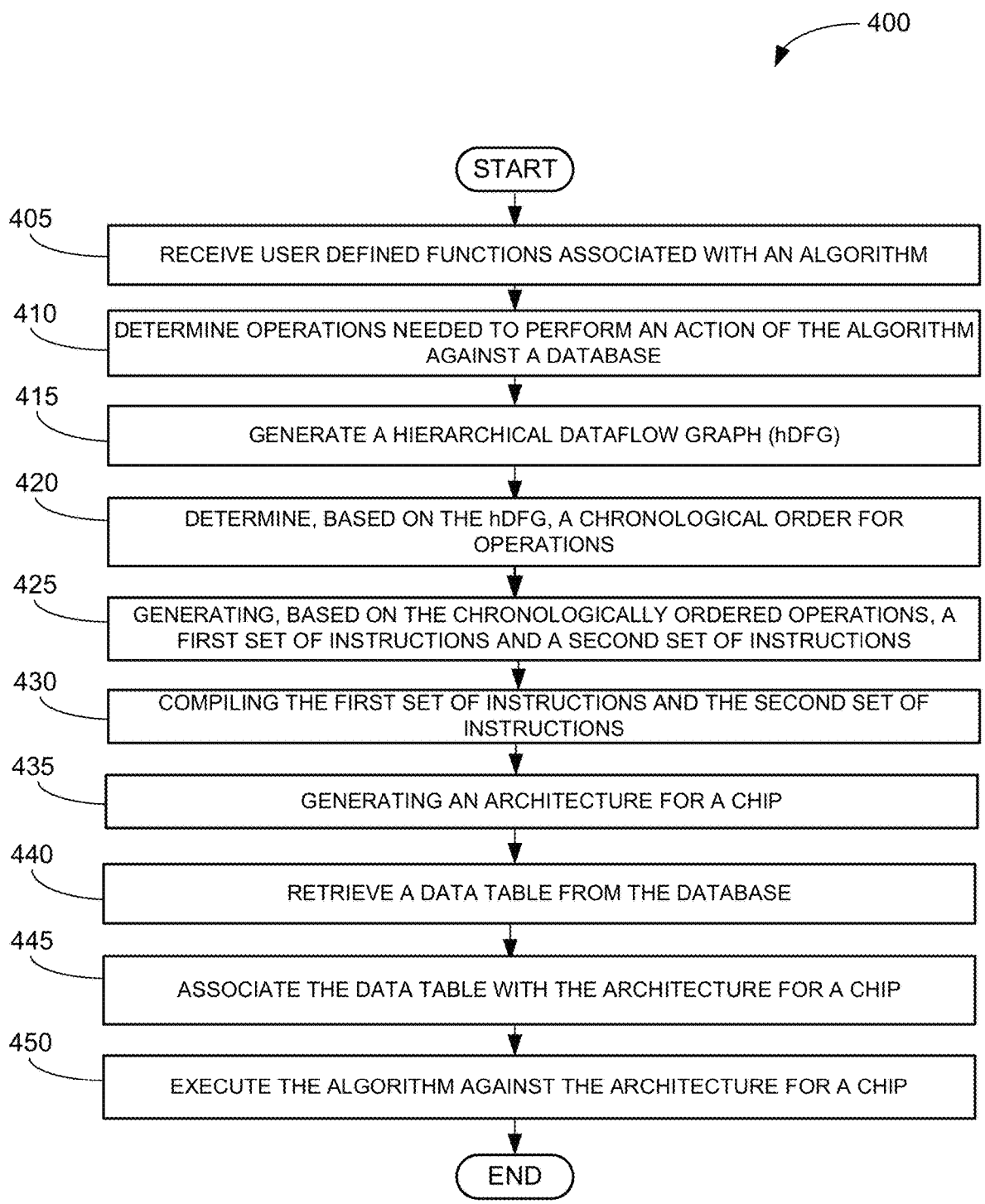
FIG. 4 is an example flow chart of a method for database management, in accordance with some examples of the present disclosure.

FIG. 4 illustrates an example flow chart of a method for database management. At 405, the method may include receiving one or more user defined functions associated with an algorithm. The user defined functions may be received by a transceiver of the computing device 110. The algorithm may include instructions to perform an action against the database 120 (e.g., update, delete, and/or re-order). At 410, based at least in part on the user defined functions, the method may determine one or more operations needed to perform the action against the database 120. In some embodiments, the processor 112 may determine the one or more operations. At 415, the method may generate a hierarchical dataflow graph (hDFG). In some embodiments, generating the hDFG may be based on the one or more user defined functions. The hDFG may include nodes and edges. The nodes may represent a mathematical operation (e.g., multiply, add, gaussian, and/or sigmoid). Meanwhile, the edges may represent a multi-dimensional vector.

At 420, based on the hDFG, the method may include determining a chronological order for the respective operations. At 425, based on the chronologically ordered operations, the method may generate a first set of instructions and a second set of instructions (e.g., ISA). At 430, the first and second set of instructions may be compiled into executable code. At 435, the method may include generating the architecture for a chip 200. Generating the architecture for a chip 200 may be based on the hDFG and/or the chronologically ordered operations. Further, the architecture for a chip 200 may include the first set of instructions and/or the second set of instructions. At 440, the architecture for a chip 200 may retrieve a data table from the database 120. Next, at 445, the architecture for a chip 200 may associate the data table with the architecture for a chip 200. At 450, the architecture for a chip 200 may execute the algorithm such that the associated action is performed against the table.

Figure 5:
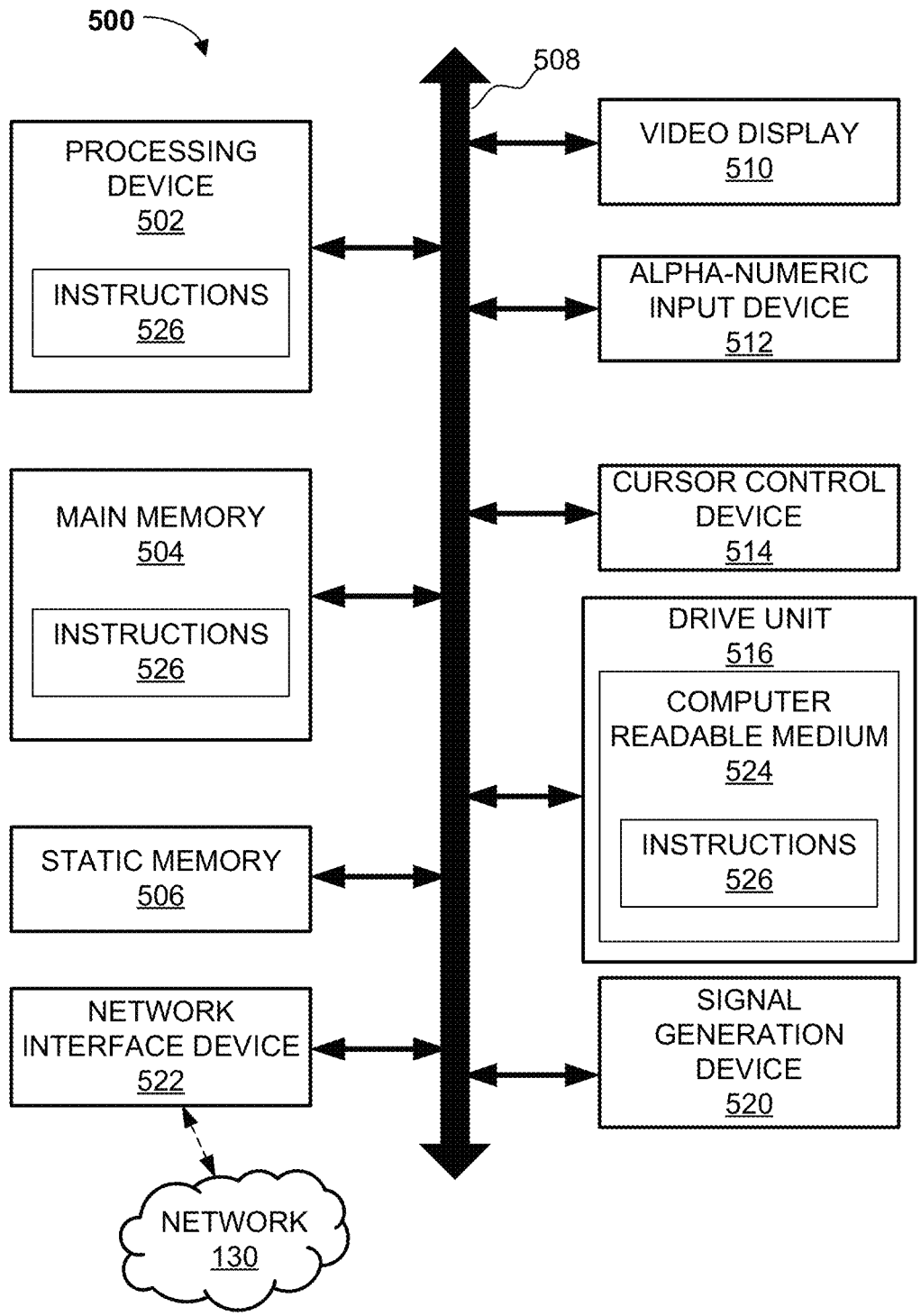
FIG. 5 is a block diagram of an example computer system for providing database management, in accordance with some examples of the present disclosure.

FIG. 5 is a block diagram of an example computer system 500 that can implement certain aspects of the present disclosure. For example, the computer system 500 can be representative of the computing device 110. The computer system 500 can include a set of instructions 526 for controlling operation of the computer system 500. In some implementations, the computer system 500 can be connected (e.g., networked) to other machines in a Local Area Network (LAN), an intranet, an extranet, a satellite communications system, or the Internet. The computer system 500 can operate in the capacity of a server or a client machine in a client-server network environment, or as a peer machine in a peer-to-peer (or distributed) network environment. As non-limiting examples, the computer system 500 can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 can be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 can further include a network interface device 522, which is connectable to a network 130. The computer system 500 also can include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 can include a non-transitory storage medium 524 on which is stored one or more sets of instructions 526 for the computer system 500 representing any one or more of the methodologies or functions described herein. For example, the instructions 526 can include instructions for implementing an asset tracking device including a power source and power management system or subsystem for a container or a trailer. The instructions 526 for the computer system 500 can also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for database management, comprising:
   receiving, by a transceiver and from a user, user defined functions, the user defined functions associated with an algorithm, wherein the algorithm is designed to perform an action against a database;
   determining, based on, at least in part, the user defined functions, operations needed to perform the action against the database;
   generating a hierarchical dataflow graph (hDFG), wherein the hDFG includes nodes and edges;
   determining, based on the hDFG, a chronological order for the respective operations;
   generating, based on the chronologically ordered operations, a first set of instructions and a second set of instructions;
   compiling the first set of instructions and the second set of instructions into executable code;
   generating an architecture for a chip based on at least one of the hDFG or the chronologically ordered operations, the architecture for a chip including the first set of instructions and the second set of instructions;
   retrieving, by the architecture for a chip and from the database, a data table;
   associating the data table with the architecture for a chip; and
   executing the algorithm against the architecture for a chip such that the action is performed against the data table.

2. The method of claim 1, wherein the algorithm is a machine learning algorithm.

3. The method of claim 1, wherein each of the nodes further comprise a respective mathematical operation.

4. The method of claim 1, wherein each of the edges comprise a respective multi-dimensional vector.

5. The method of claim 1, further comprising:
   generating, based on the first set of instructions, an access engine; and
   associating the access engine with the architecture for a chip.

6. The method of claim 5, wherein retrieving the data table from the database is performed by the access engine.

7. The method of claim 1, further comprising:
   generating, based on the second set of instructions an execution engine; and
   associating the execution engine with the architecture for a chip.

8. The method of claim 7, wherein executing the algorithm against the architecture for a chip is performed by the execution engine.

9. A method for database management, comprising:
   receiving, from a user, an algorithm, the algorithm including operations needed to perform an action against a database;
   generating, based on the algorithm, a hierarchical dataflow graph (hDFG), the hDFG including nodes representing the respective operations;
   generating, based on the hDFG, an architecture for a chip, the architecture for a chip including a first set of instructions, a second set of instructions, an access engine, and an execution engine;
   retrieving, by the architecture for a chip and from the database, the data table;
   associating the data table with the architecture for a chip; and
   executing the algorithm against the architecture for a chip such that the action is performed against the data table.

10. The method of claim 9, further comprising:
determining, based on the hDFG, a chronological order for the respective operations.

11. The method of claim 9, wherein the algorithm is a machine learning algorithm.

12. The method of claim 9, wherein each of the nodes further comprise a respective mathematical operation.

13. The method of claim 9, wherein the hDFG further comprises edges, and wherein each of the edges comprise a respective multi-dimensional vector.

14. The method of claim 9, wherein retrieving the data table from the database is performed by the access engine.

15. The method of claim 9, wherein executing the algorithm against the architecture for a chip is performed by the execution engine.

16. A system for database management, comprising:
one or more processors; and
memory in communication with the one or more processors and storing computer program code that, when executed by the one or more processors, is configured to cause the system to:
receive an algorithm, the algorithm including operations needed to perform an action against a database;
generate, based on the algorithm, a hierarchical dataflow graph (hDFG), the hDFG including nodes representing the respective operations;
generate, based on the hDFG, an architecture for a chip, the architecture for a chip including a first set of instructions, a second set of instructions, an access engine, and an execution engine;
receive, from the architecture for a chip, the data table;
associate the data table with the architecture for a chip; and
execute the algorithm against the architecture for a chip such that the action is performed against the data table.

17. The system of claim 16, wherein memory further causes the one or more processors to:
determine, based on the hDFG, a chronological order for the respective operations.

18. The system of claim 16, wherein each of the nodes further comprise a respective mathematical operation.

19. The system of claim 16, wherein the hDFG further comprises edges, and wherein each of the edges comprise a respective multi-dimensional vector.

20. The system of claim 16, wherein the algorithm is a machine learning algorithm.

* * * * *